Figure 1:
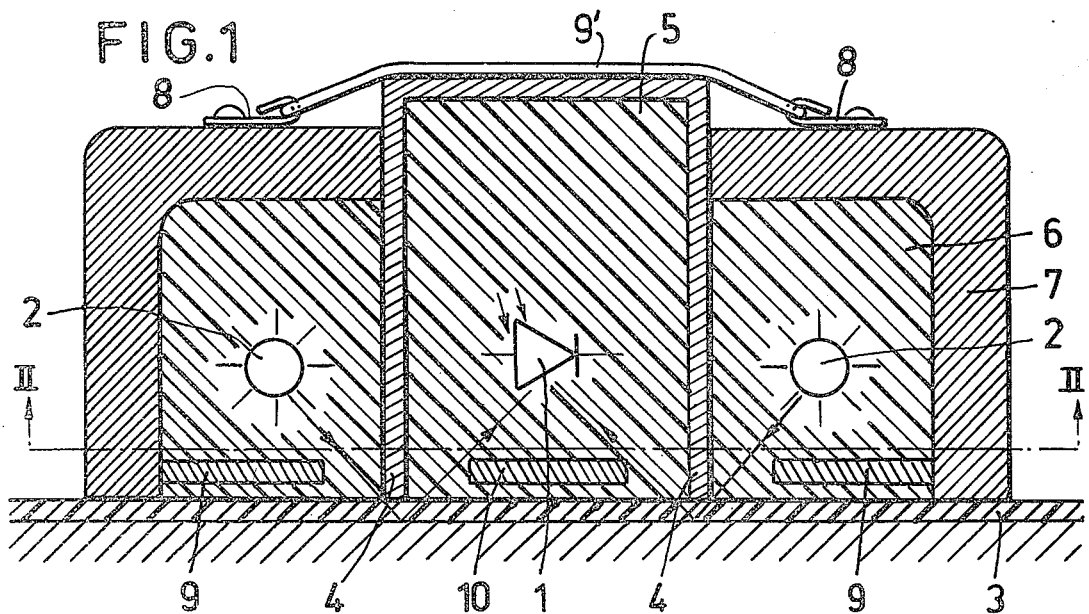

United States Patent [19]

Fladda et al.

[11] 3,997,268
[45] Dec. 14, 1976

[54] DEVICE FOR DETERMINATION OF LAYER THICKNESS, OR ALTERNATIVELY, MEASUREMENT OF SURFACE TOPOGRAPHY

[75] Inventors: Gerdt Fladda, Taby; Lennart Eriksson, Vallentuna, both of Sweden

[73] Assignee: Svenska Traforskningsinstitutet, Stockholm, Sweden

[22] Filed: Apr. 23, 1975

[21] Appl. No.: 570,914

[30] Foreign Application Priority Data

Apr. 26, 1974 Sweden .............................. 7405630

[52] U.S. Cl. ............................... 356/161; 356/199
[51] Int. Cl.[2] ......................................... G01B 11/06
[58] Field of Search .................. 356/161, 199, 200; 65/29, 158

[56] References Cited

UNITED STATES PATENTS 1,503,543  8/1924  Lytle ................................ 356/161

FOREIGN PATENTS OR APPLICATIONS 1,045,110  11/1958  Germany .......................... 356/161
1,083,060  6/1960  Germany .......................... 356/161
1,079,947  8/1967  United Kingdom Primary Examiner—John K. Corbin
Assistant Examiner—Richard A. Rosenberger
Attorney, Agent, or Firm—Pollock, VandeSande & Priddy

[57] ABSTRACT

A device for determining by means of light the average thickness of a layer, permeable to said light, arranged on a surface having properties different from those of the layer with respect to the light used, and also adapted to be used to provide a measure of the topography of a surface substantially opaque to the light used, includes an opaque shield that bears substantially perpendicularly with one edge against the layer when thickness is being determined or against the surface when surface topography is being measured. At least one light indicator shielded from direct incident light is arranged on the side of the shield opposite to the side on which the light source is located. The light indicator responds to the emitted luminous flux which it receives indirectly from the light source, which in a thickness determination is transferred to the indicator past the lower edge of the shield via the permeable layer, or in the measuring of surface topography passes through openings formed between the irregular surface being measured and the planar edge of the shield engaging that surface. The signal from the light indicator due to the transferred luminous flux is arranged, optionally after further evaluation, to indicate the layer thickness or surface topography.

15 Claims, 4 Drawing Figures

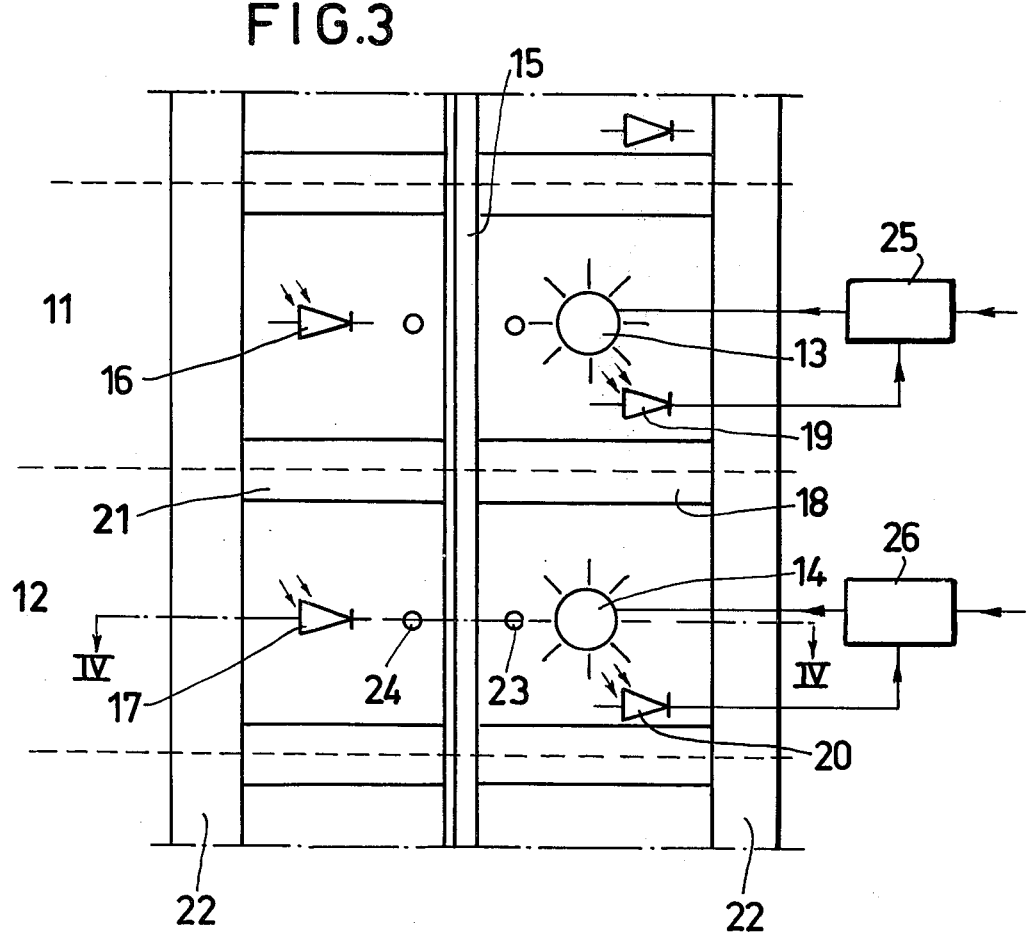
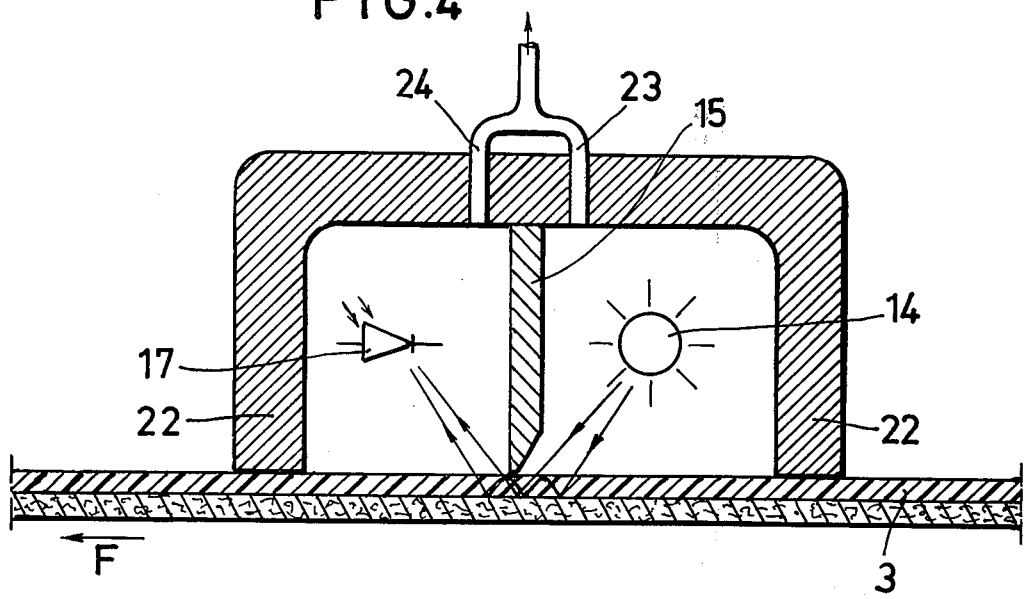

DEVICE FOR DETERMINATION OF LAYER THICKNESS, OR ALTERNATIVELY, MEASUREMENT OF SURFACE TOPOGRAPHY

This invention relates to a device for determining by means of light the average thickness of a layer permeable to the light used, said layer being arranged on a surface having properties different from those of the layer with respect to the light used, or for providing a measure of the surface topography of a surface substantially untransparent to the light used.

For a long time there has been a need to measure in a simple way the thickness of a layer arranged on some form of support, such as a plastic layer provided on a paper sheet or some solid material, such as a plastic layer on a plate surface or the like. Especially in plastic coating of paper webs by extrusion it has previously been very difficult to control the thickness of the plastic layer so that it will be uniform across the web and not change in the course of time, as due to the manufacturing processes, which need not be described here, there is a tendency that the layer will be thicker in the middle than at the sides. Moreover, there has previously not existed any simple method for controlling continuously the layer thickness without destroying the paper web.

For measuring the layer thickness during the manufacturing process on the spots where it has been desired to carry out measurement, the paper web, prior to plastic coating as a rule has been provided with a wax layer from edge to edge. Then the waxed part of the paper web has been cut out. As it is assumed that the plastic layer is applied evenly along the paper web and thus gets the same thickness both across the untreated paper as across the paper coated with wax, the thickness of the plastic layer coated on the wax layer, which plastic layer can be loosened easily and be measured, has been taken as a measure of the plastic thickness.

The disadvantages of this method are obvious. The paper web must be provided with wax and must be cut, which means that the measurement cannot be made continuously. According to common practice this measurement is only carried out during initial adjustment of the machine which is to carry out the plastic coating, and therefore the layer thickness can change later on without being readily discovered during the course of production.

It is primarily the object of the invention to produce a device, by means of which a nondestructive measurement of layer thickness can be achieved, which should preferably be made continuously. This object is achieved in such a way that the device of the invention has been provided with a shield substantially impermeable to light, which bears substantially perpendicularly with one edge against the layer in case of thickness determination or against the surface in case of measurement of the surface topography, and that at least one light indicator shielded from the direct incident light used is arranged on the opposite side of the shield in relation to the side to which the light used is incident, the light indicator being arranged merely to indicate the emitted luminous flux used, which in thickness determination is transferred at the lower edge of the shield via the permeable layer or in measurement of surface topography via cavities in the surface to the side of the shield, where the light indicator is present, and that the signal supplied from the light indicator due to the transferred luminous flux is arranged, optionally after further evaluation, to indicate the layer thickness or surface topography. For a safe function the edge of the shield bearing against the layer or surface should be thin relative to the expected thickness of the layer.

According to a preferred embodiment the shield is arranged around the light indicator or indicators, and several light sources are arranged around the shield. Of course the shield can instead be placed around the light source or light sources and several light indicators can be disposed around the shield.

At the lower edge of the shield the side facing the light source or sources should preferably be shielded from or shield all disturbing light that might influence the light indicator or indicators. In order to reduce the influence of disturbing light to a minimum the light source or sources may emit light within one or more narrow frequency ranges, which need not be within the visible range, the light indicator or indicators preferably being sensitive only to certain frequency ranges, within which the light from the light source or sources are present. A polarized light can also be used.

The light indicator or indicators and/or the light source or sources are preferably cast in a material transparent to the light used with such a design that the shield is in good contact with the surface. The shield had better be arranged in the form of a coating, preferably obtained by means of evaporation, on the transparent material and arranged so that the light from the light source or sources can only reach the light indicator or indicators via the test surface. For a still safer result the light source or sources and/or the light indicator or indicators can also be shielded relative to the test surface so that the light can be incident to or be emitted from the surface towards or from a section close to the shield.

In order to provide that the luminous flux from the light source or sources has a desired level, preferably a constant one, one or more additional light indicators are arranged on the same side of the shield as the light source or sources, and each additional light indicator cooperates with one or more of the light sources so that the output signal of each additional light indicator is arranged to be fed to an adjusting means, which is adapted to adjust the feeding of the light sources belonging to the corresponding additional light indicator so that the output signal of the additional light indicator is kept at a constant level.

In order to simultaneously establish if the layer thickness is the same at various places of a surface the device can further be provided with additional means of the same type, all the means being shielded relative to each other for separate determinations of layer thickness or measurements of surface topography on different ranges of the surface. In continuous measurement of e.g. a plastic coating on a paper web it is advantageous if all the means of a similar type are placed in a row beside each other.

Figure 2:
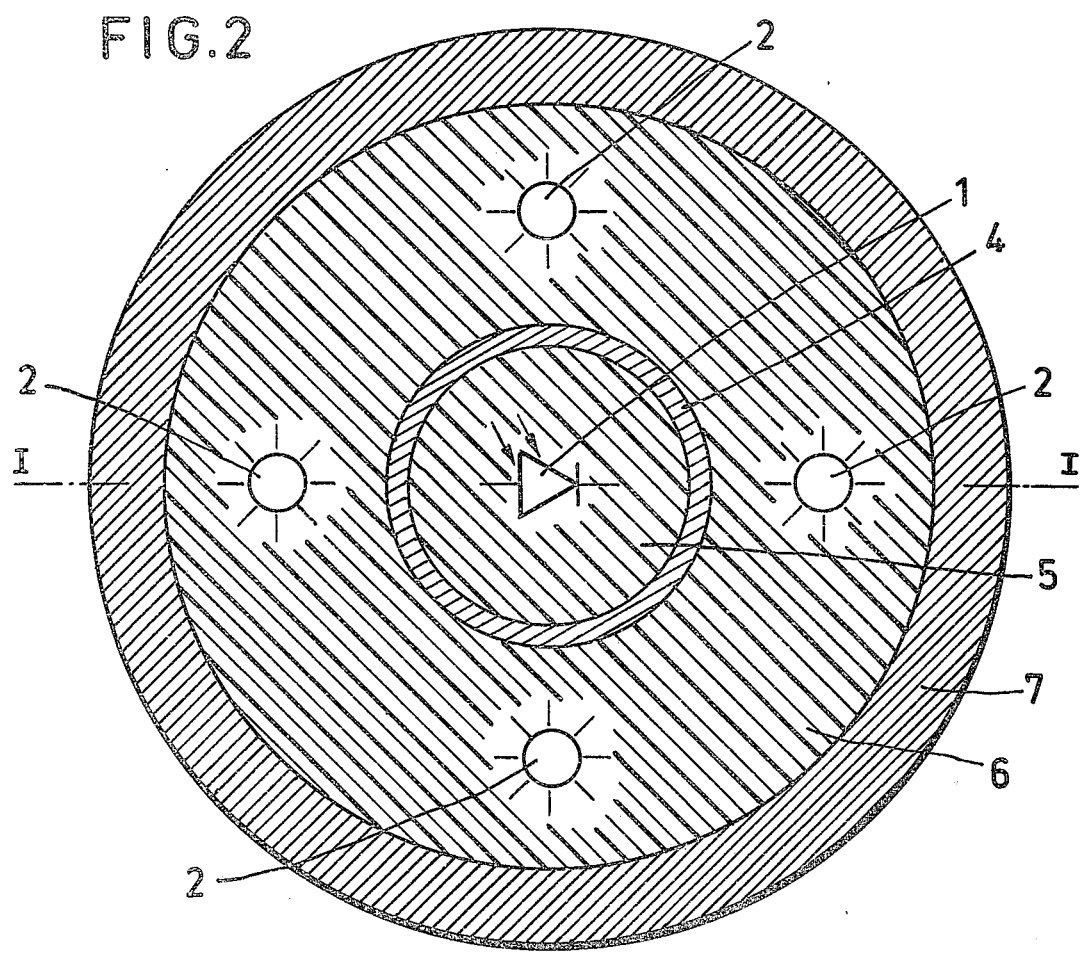

These and other objects and advantages will become apparent from the following description used in connection with the accompanying drawings, in which FIG. 1 is a cross section of a first embodiment of the device of the invention, FIG. 2 is a section along the line II—II in FIG. 1, FIG. 3 is a view from below of a second embodiment of the device of the invention, and FIG. 4 is a cross section through the device along the line IV—IV in FIG. 3.

In FIGS. 1 and 2 an embodiment of the device of the invention is shown, where a photo diode 1 is actuated by light from four light sources 2, which consist of lamps in the embodiment shown. The light from the light sources do not actuate the photo diode 1 directly but via a layer 3 of transparent plastic adapted on a material relatively non-transparent to the light used in such a way that a shield 4 of a material, which is substantially impermeable to the light used, lies close to the layer 3 so that the light from the light sources 2 does not reach the photo diode 1 directly but via the layer 3. Of course a plurality of photo diodes connected in a suitable way can also be used instead of only one. In the embodiment shown the photo diode 1, which is only indicated schematically in the Figures, is moulded into a transparent plastic cylinder 5, on which the opaque light shield 4 is arranged around the mantle surface and on the one end surface, e.g. in the form of a layer of aluminum applied by means of evaporation, which layer should be thin relative to the expected thickness of the coating at least at the edge lying at the layer 3. With an expected layer thickness of the layer 3 of 15 microns, a thickness of the aluminum layer of 4 microns has turned out to be suitable. Also the light sources 2 are moulded into a hollow cylinder 6 of a plastic transparent to the used light and cylinder 6 is positioned around the cylinder 5 and its light shield 4, with cylinder 6 sealing relatively tightly against the shield 4. The outside of the hollow cylinder 6 is also provided with a light shield 7, but this is preferably much thicker than the shield 4, as it should exclude external disturbing light. It is important that the shield 4 bears firmly against the layer 3, and therefore the cylinder 5 is pressed with the shield 4 against the layer 3 by means of a rubber band 9' arranged over the cylinder 5 and attached with both of its ends in hooks 8. Of course any other device providing a satisfactory contact between the cylinder 5 and the layer 3 can be considered. In the embodiment shown the side of the light sources 2 and the light indicator 1 facing the test surface is shielded by means of the shields 9 and 10, respectively, so that light can only be incident to respectively be emitted from the surface to or from a section close to the shield.

In this embodiment it is also possible to consider, instead of a photo diode placed in the middle of the device with a shield around it and with light sources placed around the shield, the arrangement of one or more light sources with a shield around them and to place photo diodes connected in a suitable way around the shield.

The part of the cylinder 5 with the shield 4 facing the layer 3 has also such a design that the shield 4 is in good contact with the surface, and in the case shown with a flat, running layer the cylinder 5 with the shield 4 is face-ground as well as the hollow cylinder 6 with the shield 7.

FIGS. 3 and 4 show schematically another embodiment of the device of the invention primarily for continuous control of the thickness of the plastic layer of a paper web coated with a plastic transparent to the light used. Several sections 11, 12 are arranged beside each other, which sections in the embodiment shown each consist of a light source 13, 14 and light indicator 16, 17 arranged on opposite sides of the shield 15, which is influenced via the layer 3 by the light from the light source. Moreover, on the same side of the shield 15 as the light source 13 another light indicator 19, 20 is arranged, whose output signal is supplied to a regulating means 25, 26 which adjusts the supply of power to the light source in such a way that the output signal of the other light indicator 19, 20 is kept at a constant. By this measure it is guaranteed that the light radiating from the light source is kept at a constant, and in this way a safer measuring result is obtained as the variation of the light transmitted to the light indicator 16, 17 will merely be dependent on the properties of the layer 3 and possibly also on those of the material lying under the layer 3 and not on possible fluctuations of the light radiating from the very light source.

Between all the adjacent sections 11, 12 there are relatively wide intermediate walls 18, 21 to prevent the different sections from actuating each other. Moreover, there is a casing 22 around the whole measuring device to prevent outer light of disturbing kind from penetrating into the device and cause errors in the measuring results.

In order that the shield 15 should be in good contact with the layer 3 a certain negative pressure has been arranged in this case around the shield, so that e.g. in case of a paper web coated with plastic this is sucked to contact with the shield 15. In the embodiment shown this is provided by means of the pipe system 23, 24, where one pipe ends in the roof of each chamber in each section and the pipes preferably are connected to a common suction device. As neither the light source nor the light indicators are embedded in any material transparent to the light used, the shield 15 consists in the embodiment shown, for reasons of resistance, of a relatively thick disc, which is bevelled at its lower edge bearing against the layer 3, so that an edge is formed, as it is desired for a good result that the edge of the shield 15 bearing against the layer should be thin relative to the expected thickness of the layer. However, in this case it must be observed that the edge should not be so sharp and/or the suction effect so strong that the edge could damage the material, the thickness of which is to be measured, by cutting through the same. In the embodiment shown the lower edge of the shield is somewhat rounded, and, moreover, the bevelling is directed so, that the measuring object moving in the direction of the arrow F does not meet with the edge but is pulled along the same.

The inventive device is not only intended for measuring for thickness of a layer transparent to the light used arranged on a surface of a device of a material relatively nontransparent to the used light but can also be used with a relatively good result for measuring the thickness of a layer of a material, which is not directly transparent to the light used but merely permeable and arranged on a surface of a device of a material which is less permeable to the light used than that of the layer arranged on the surface.

It has also been found to be possible to use the inventive device to obtain in a simple way a measure of the surface topography of a surface, i.e. to obtain a measure of how even or rough a surface is, as when the shield makes contact with a surface more light may penetrate under the shield the rougher the surface is.

Several different modifications are possible within the scope of invention.

What is claimed is:

1. A unitary measuring device adapted to be placed in firm engagement with a surface for measuring a dimensional characteristic of said surface, said device having a lower side adapted to be placed in direct engagement with said surface, a light opaque external shield structure completely enclosing the exterior of said unitary device except for its said lower side, said external shield structure having a lower edge surrounding said lower side and adapted to firmly engage said surface to prevent the ingress of external light to the interior of said external shield structure, a light opaque inner shield structure within said external shield structure subdividing the interior of said device bounded by said external shield and said lower side into at least two interior regions, a source of light located in one of said interior regions between said external shield structure and one side of said inner shield structure, and light sensitive means located in the other of said interior regions between said external shield structure and the other side of said inner shield structure, said inner shield structure being positioned transverse to said lower side and having a light opaque lower edge disposed along said surface being measured whereby, when said lower side of said device is in engagement with said surface, luminous flux emitted by said light source in said one region may reach said light sensitive means located in the other of said regions only by transfer through a path extending through the portion of said lower side underlying said one region to a location disposed below said lower edge of said inner shield structure and then to the portion of said lower side underlying said other region and to said light sensitive device, and indicator means coupled to said light sensitive device and responsive to the portion of the total luminous flux emitted by said light source which reaches said light sensitive device through said path for indicating said dimensional characteristic of said surface.

2. The device of claim 1 wherein said dimensional characteristic being measured is the thickness of a light permeable layer on a substantially light opaque surface, the edge of said inner shield structure bearing against said layer being thin relative to the expected thickness of said layer.

3. The device of claim 2 wherein said inner shield structure is cylindrical and surrounds said light sensitive means.

4. The device of claim 3 wherein a plurality of said light sources are arranged around said inner shield.

5. The device of claim 2 wherein said inner shield structure is cylindrical and surrounds said light source.

6. The device of claim 5 including a plurality of said light sensitive means arranged around said inner shield structure.

7. The device of claim 1 wherein said light source emits light within a narrow frequency range.

8. The device of claim 7 wherein said light sensitive means is responsive only to light within a predetermined frequency range which includes said narrow frequency range.

9. The device of claim 1 wherein said light source provides polarized light.

10. The device of claim 1 wherein each of said interior regions is filled with a light transparent material, said light sensitive means and said light source each being embedded within said material.

11. The device of claim 10 wherein said inner shield structure comprises an opaque coating on surfaces of said light transparent material.

12. The device of claim 1 including additional light shield structures disposed within each of said interior regions adjacent to said lower side of said device for confining said path of light transfer to portions of said lower side disposed closely adjacent to said inner shield structure.

13. The device of claim 1 wherein at least one additional light sensitive means is arranged on the same side of said inner shield as said light source, and means responsive to the output signal from said additional light sensitive means for adjusting the light output of said light source to keep said light output constant.

14. The device of claim 1 wherein said device includes a plurality of said light sources and a plurality of said light sensitive means all of which are shielded from one another.

15. The device of claim 14 wherein all of said light sources are disposed in a row, and all of said light sensitive means are disposed in a further row.

* * * * *